Patented Oct. 23, 1945

2,387,670

UNITED STATES PATENT OFFICE 2,387,670

RADIO DIRECTION FINDER

David G. C. Luck, Hightstown, N. J., assignor to Radio Corporation of America, a corporation of Delaware Application August 28, 1942, Serial No. 456,495

5 Claims. (Cl. 250—11)

This invention relates to radio direction finding and more particularly to the compensation of the stray pickup errors of a shielded-U Adcock antenna system.

The shielded-U Adcock comprises one or more pairs of spaced vertical antennas. The verticals of each pair are connected to opposite sides of a utilization circuit so that their resultant output is substantially proportional in amplitude to the difference in phase between the two individual antenna voltages. The necessary horizontal leads between the two antennas and the utilization circuit are thoroughly shielded, usually by coaxial shields, and buried beneath the ground or a conductive screen. This type of structure is used in an attempt to prevent response to horizontal electric field components by avoiding exposed horizontal conductors in the antenna circuits.

It is found in practice, however, that shielded-U Adcocks do exhibit response to horizontal electric field components. One explanation for such response is that currents induced by horizontal field components in imperfect conductors adjacent the antennas, such as the shields or the ground screen, produce voltage drops in said conductors. Thus there is a radio frequency voltage gradient along the ground plane under the bases of the spaced antennas. This voltage is coupled into the antennas themselves by way of their direct capacitance to the nearby regions of the grounded plane, and so enters the system.

When the signals produced in the above manner are large enough to be of the same order of magnitude as signals derived from the vertical electric field by the antennas, serious errors are introduced in the bearing indications of a direction finder employing shielded-U Adcock pairs.

Accordingly, it is an object of this invention to provide an improved method of and means for increasing the accuracy of direction finders with shielded-U Adcock antenna systems.

Another object is to provide a method of and means for decreasing the response of a shielded-U Adcock to horizontal electric field components.

A further object is to provide a method of and means for neutralizing the coupling of voltages on nearby horizontal conductors to the vertical antennas of a shielded-U Adcock system.

These and other and incidental objects will become apparent to those skilled in the art upon consideration of the following description with reference to the accompanying drawing, of which Figure 1 is a schematic diagram of a circuit equivalent of a shielded-U Adcock antenna system, Figure 2 is a schematic diagram, partially in section, of a shelded-U Adcock system embodying the invention, and Figure 3 is a modification of Figure 2.

Referring to Figure 1, the potential at a point midway between the bases of a pair of Adcock verticals is selected as a reference or "ground" potential. The desired signals produced in the antennas by a vertical electric field component are represented by the alternators $Ev$ and $Ev'$. The impedances $Za$ and $Za'$ represent the radiation resistances of the respective antennas and the impedance $Z$ represents the load or utilization circuit. The alternators $Eh$ and $Eh'$ represent the voltages induced in the horizontal conductors adjacent the antennas by a horizontal electric field component and the impedances $Zc$ and $Zc'$ represent the capacitive couplings between the respective antennas and the sources $Eh$ and $Eh'$, respectively.

The desired signal voltages $Ev$ and $Ev'$ are applied in opposition to each other to the load $Z$ through the impedances $Za$ and $Za'$. The undesired signal voltages $Eh$ and $Eh'$ are applied in aiding relationship to the load $Z$ through the impedances $Zc$ and $Zc'$. In a properly constructed system, the voltages $Ev$ and $Ev'$ will differ only in phase, not in amplitude, and impedances $Za$ and $Za'$ will be equal. The voltage across $Z$ as a result of the voltages $Ev$ and $Ev'$ will be in quadrature with the mean of the phases of $Ev$ and $Ev'$, and of an amplitude often much lower than that of $Ev$ and $Ev'$. The voltages $Eh$ and $Eh'$, on the other hand, will produce at the load $Z$ a resultant effect substantially equal to the sum of their individual effects.

The coupling of the voltages $Eh$ and $Eh'$ to the load $Z$ through the impedances $Zc$ and $Zc'$ is substantially cancelled by providing capacitors $C$ and $C'$, connected across from each of the sources $Eh$ and $Eh'$ to the respectively opposite sides of the load $Z$. The capacitors $C$ and $C'$ are adjusted to such values that the currents flowing through them are equal to the currents through $Zc$ and $Zc'$, respectively. Under these conditions, the sources $Eh$ and $Eh'$ produce no current through the load $Z$, and hence no voltage drop across it. Even with antennas sufficiently high to cause $Za$ and $Za'$ to depart markedly from pure capacitive reactances of magnitude varying inversely with frequency, the coupling impedances $Zc$ and $Zc'$ will approach closely the behavior of pure capacitances. Therefore the balance will be effective over a range of frequencies.

Fig. 2 illustrates a practical embodiment of the invention with an Adcock antenna pair A—A' connected through buried horizontal wires B, B' to a transformer primary Z. The capacitive antenna to ground plane couplings Zc and Zc' are neutralized by capacitors C and C' connected to the load Z by wires D and D', and to the ground plane near the bases of the respective antennas.

The neutralizing capacitors may be located, as shown in Fig. 3, near the load Z. This arrangement, however, will not prove as satisfactory as that of Fig. 2 where a wide range of frequencies is to be covered. The reason for this is that the shunt capacitances of the lines D, D' appear on the opposite sides of the capacitors C, C' from those of the lines B, B', so that the two circuits are not symmetrical.

Thus the invention has been described as a system for neutralizing capacitive coupling between the antennas of an Adcock pair and the ground plane. This is done to prevent undesired response of the antenna system to horizontally polarized waves, and thereby improve the accuracy of operation of said system in radio direction finding.

I claim as my invention:

1. An antenna system comprising a pair of spaced vertical conductors, disposed above a conductive ground plane, a utilization circuit including two terminals, horizontal conductors disposed below said conductive plane and connecting said vertical conductors to respective terminals of said utilization circuit, and a pair of capacitors, each connected between a point on said ground plane near the base of one of said vertical conductors and the terminal of said utilization circuit which is connected to the other of said vertical conductors.

2. In a radio direction finder system a shielded-U Adcock antenna including two elements, a utilization circuit including two terminals, and two capacitors, one connected from each of said terminals respectively to a point on the ground adjacent the base of a respective one of said elements of said antenna so as to neutralize the capacitive couplings of said elements to ground.

3. A shielded-U Adcock antenna system including a pair of spaced vertical antennas disposed above a conductive plane, a utilization circuit including two terminals, horizontal conductors disposed below said plane and connecting said antennas to respective terminals of a utilization circuit, and a pair of capacitors, each connected from one terminal of said utilization circuit to a point on said conductive plane near the base of the antenna which is connected to the other terminal of said utilization circuit.

4. An antenna system comprising a pair of spaced vertical antennas disposed above a ground plane, a pair of capacitors, horizontal conductors disposed below said plane and connecting the lower ends of said antennas through said capacitors respectively to points on said ground plane adjacent the bases of the respectively opposite antennas; and a load circuit connected between said horizontal conductors at points substantially midway between said antennas.

5. An antenna system comprising a pair of spaced vertical antennas disposed above a ground plane, each having capacitive coupling to said plane, a pair of capacitors, horizontal conductors disposed beneath said plane and connecting the lower end of each of said antennas through a respective one of said capacitors to a point on said ground plane adjacent the base of the other of said antennas, and a load circuit connected between said horizontal conductors at points substantially midway between said antennas, whereby voltages picked up directly by said antennas are applied to said load, and voltages appearing on said ground plane and applied to said antennas through said capacitive couplings are neutralized with respect to said load.

DAVID G. C. LUCK.